Figure 1:
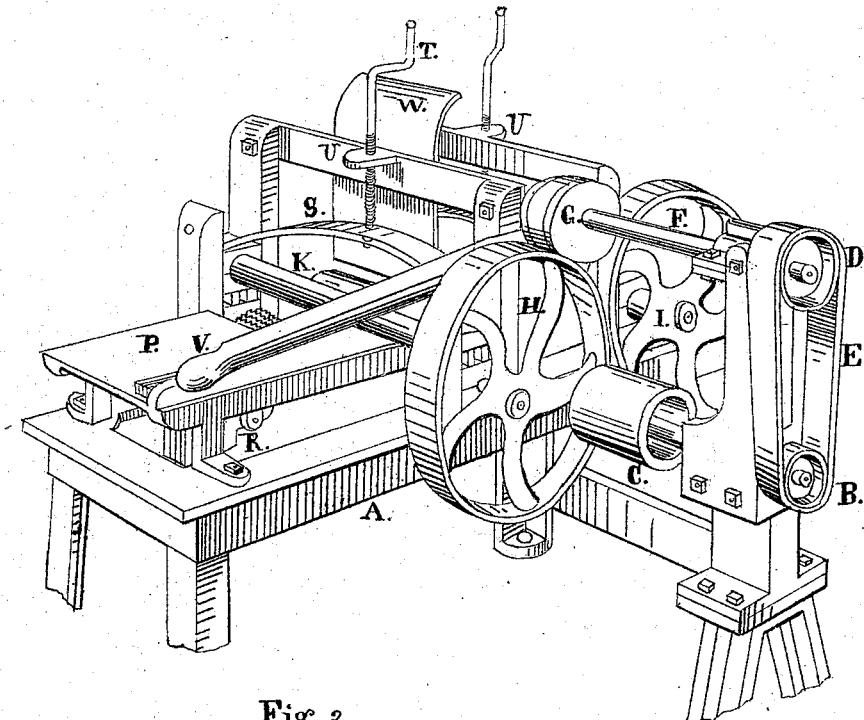

J. M. STOWELL.
Machines for Sawing Laths.

No. 136,944.                                    Patented March 18, 1873.

Witnesses:                    John M. Stowell, Inventor

UNITED STATES PATENT OFFICE.

JOHN M. STOWELL, OF MILWAUKEE, WISCONSIN.

IMPROVEMENT IN MACHINES FOR SAWING LATHS.

Specification forming part of Letters Patent No. 136,944, dated March 18, 1873.

To all whom it may concern:

Be it known that I, JOHN M. STOWELL, of Milwaukee, in the county of Milwaukee, in the State of Wisconsin, have invented certain Improvements in Machines for Sawing Laths, of which the following is a specification:

Nature and Object of the Invention.

My invention is a lath or picket mill, and is arranged with collars on the saw-arbor to fit in between the saws to hold them the proper distance apart for lath or pickets, with changeable guides for the bolt to bear against, so as not to saw the bark on the bolts. These guides are held up by weights, and the feed-works are run by a friction-pulley.

Description of the Drawing forming part of this Specification.

Figure 3:
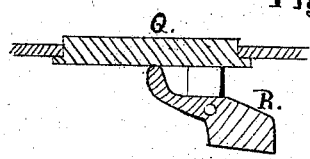
Figure 2:
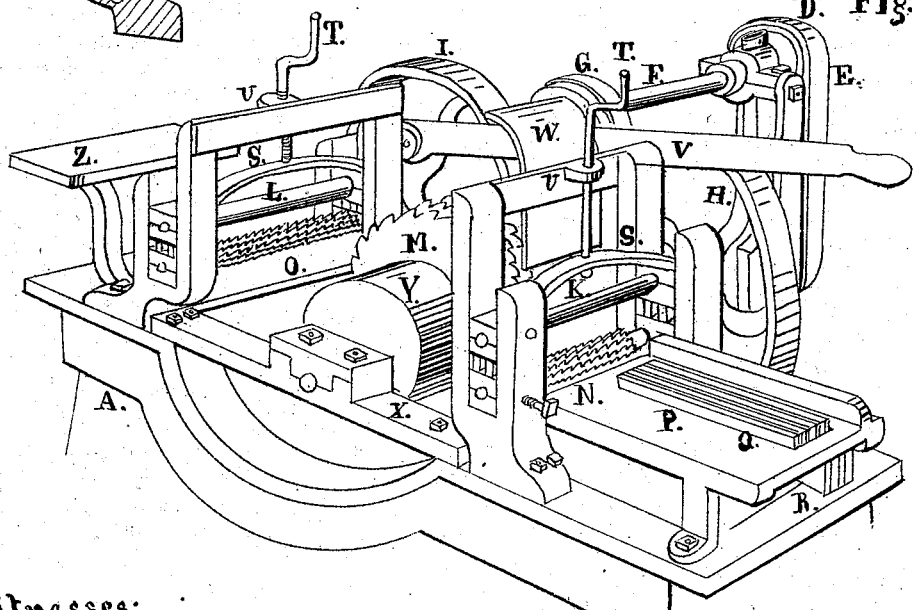

Figure 1 is a perspective view of one side of my invention; Fig. 2, a perspective view of the other side; and Fig. 3, a view of one of the guides and the weight which holds it up in position.

General Description.

A is the frame of the machine; B, the arbor of the saws; C, the pulley by which the saws are put in motion; D, pulley on the arbor of the friction-pulley; E, belt from saw-arbor pulley to pulley D; F, arbor of friction-pulley; G, friction-pulley; H, wheel on toothed feed-roller in front of the saws; I, wheel on feed-roller behind the saws which conveys the lath or pickets away from the saws; K, pressure-roller, which holds the bolt to the feed-roller N; L, pressure-roller which holds the lath or picket onto roller O; M, saws on arbor B; N, feed-roller with teeth on it under pressure-roller K; O, feed-roller with teeth under pressure-roller L; P, platform in front of saws, on which the lumber or bolt is placed to be sawed; Q, guides for the lumber or bolt to be placed on or against to be sawed; R, weights to hold the guides up in position; S S, springs to hold rollers down onto the lumber to be sawed; T T, crank-screws screwing through nuts U U to hold springs S S down; V, lever with which to regulate the pressure of friction-roller G; W, saw-dust fender; X, adjustable plate or girt on which the end of saw-arbor B rests.

This plate is arranged to be moved out or in so as to permit wider or narrower collars to keep the saws the right distance apart for the purpose of sawing lath or pickets or any other article that the machine may be capable of sawing. Y, rings or collars on the saw-arbor to adjust the saws the proper distance apart and to hold them firmly in place; Z, a table in rear of the rear rollers for the lath or pickets to rest on as they pass from the saw.

This machine is adjustable to saw laths or pickets. The pressure-rollers K and L, running independently of anything else, can be spread apart as far as necessary by loosening crank-screws T. The saws may be regulated the proper distance apart by the collars Y and the lumber bolted for lath or pickets. Either may be placed on the platform P, and, by being put onto either of the guides, the guides on which it is placed will be pressed down even with the platform P and press up against the one not pressed on; or, if wide enough to take up the whole distance to the fence on the outside of the platform, then press down all the guides and let the bolt press against the fence and enter the bolt between the rollers N and K. The teeth in it will take hold of the bolt and feed it forward to the saws, which will cut the bolt into such strips as they may be set to cut; and when the bolt passes the saws rollers O and L will take hold of the strips and pass them through over the table Z. The friction-roller or pulley, being pressed down by means of lever V, will turn wheels H and I and feed the bolt to the saws. Whenever it is necessary to stop the feed, raise lever V, and the feed will be suspended.

Claim.

I claim as my invention—

The table provided with self-adjusting gage-bars, serrated feed-rolls, and pressure-rolls L K with their operative mechanism, in combination with the gang of circular saws and receiving-table Z, substantially as and for the purpose set forth.

JOHN M. STOWELL.

Witnesses:
J. B. SMITH,
EDMD. MOODY.